(12) United States Patent
Allouche et al.

(10) Patent No.: US 10,602,360 B2
(45) Date of Patent: Mar. 24, 2020

(54) SECURE MOBILE DEVICE INTEGRATION WITH VEHICLES

(71) Applicant: International Business Machines Corporation, Armonk, NY (US)

(72) Inventors: Yair Allouche, Dvira (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/479,282

(22) Filed: Apr. 5, 2017

(65) Prior Publication Data

US 2018/0295518 A1    Oct. 11, 2018

(51) Int. Cl.
| | |
|---|---|
| H04W 12/08 | (2009.01) |
| G06F 21/57 | (2013.01) |
| H04L 29/06 | (2006.01) |
| H04L 9/32 | (2006.01) |
| G06F 21/62 | (2013.01) |
| H04W 4/40 | (2018.01) |
| H04W 12/00 | (2009.01) |

(52) U.S. Cl.
CPC .......... *H04W 12/08* (2013.01); *G06F 21/577* (2013.01); *G06F 21/62* (2013.01); *H04L 9/3268* (2013.01); *H04L 63/0823* (2013.01); *H04L 63/105* (2013.01); *H04W 4/40* (2018.02); *H04W 12/00505* (2019.01); *H04L 2209/80* (2013.01); *H04L 2209/84* (2013.01); *H04W 12/00512* (2019.01); *H04W 12/00514* (2019.01)

(58) Field of Classification Search
None
See application file for complete search history.

(56) References Cited

U.S. PATENT DOCUMENTS

| | | |
|---|---|---|
| 7,904,569 B1 | 3/2011 | Gelvin et al. |
| 8,499,154 B2 | 7/2013 | Huntzicker et al. |
| 8,966,248 B2 | 2/2015 | Baltes et al. |
| 9,282,110 B2 | 3/2016 | Zhang et al. |

(Continued)

OTHER PUBLICATIONS

Kumar et al., Binary Hash Tree based Certificate Access Management for Connected Vehicles, 2017, In Proceedings of WiSec'17, pp. 145-155. (Year: 2017).*

(Continued)

*Primary Examiner* — Roderick Tolentino
*Assistant Examiner* — Edward X Long
(74) *Attorney, Agent, or Firm* — Dvir Gassner

(57) ABSTRACT

A computerized method comprising, on a mobile computing device, processing a vehicle integration request made by one or more of (i) the mobile computing device and (ii) a transportation vehicle. The mobile computing device computes a risk assessment value that quantifies a security risk to the transportation vehicle as a result of connecting the mobile computing device to the transportation vehicle, where the computing is based on one or more of a hardware and a software of the mobile computing device. The mobile computing device transmits the risk assessment value to a vehicle computer integrated in the transportation vehicle. The mobile computing device completes a digital data connection with the vehicle computer when the risk assessment value complies with a vehicle access security policy of the vehicle computer.

6 Claims, 3 Drawing Sheets

(56) References Cited

U.S. PATENT DOCUMENTS

| | | | | |
|---|---|---|---|---|
| 2009/0328216 A1* | 12/2009 | Rafalovich | ......... | H04L 43/0876 |
| | | | | 726/23 |
| 2011/0276313 A1* | 11/2011 | Inaba | .................. | G07C 5/0858 |
| | | | | 702/187 |
| 2013/0097660 A1* | 4/2013 | Das | ......................... | H04L 63/10 |
| | | | | 726/1 |
| 2014/0163771 A1 | 6/2014 | Demeniuk | | |
| 2015/0339664 A1* | 11/2015 | Wong | .................... | H04W 12/06 |
| | | | | 705/71 |
| 2016/0112451 A1* | 4/2016 | Jevans | ................ | H04L 63/1433 |
| | | | | 726/25 |
| 2016/0234206 A1* | 8/2016 | Tunnell | ................... | H04W 4/70 |
| 2017/0063842 A1* | 3/2017 | Ahn | .................... | H04L 63/0823 |
| 2017/0242428 A1* | 8/2017 | Pal | .......................... | H04W 4/90 |

OTHER PUBLICATIONS

Feiri et al., Congestion-based Certificate Omission in Vanets, 2012, Vanet'12, pp. 135-137. (Year: 2012).*

Han et al., "On Authentication in a Connected Vehicle: Secure Integration of Mobile Devices with Vehicular Networks", 2013 ACM/IEEE International Conference on Cyber-Physical Systems (ICCPS), Apr. 2013, pp. 160-169.

Dardanelli et al., "A Security Layer for Smartphone-to-Vehicle Communication Over Bluetooth", IEEE Embedded Systems Letters, Sep. 2013, vol. 5, No. 3, pp. 34-37.

Kochanek et al., "Secure Integration of Mobile Devices for Automotive Services", Politecnico di Milano, Mar. 2015.

* cited by examiner

SECURE MOBILE DEVICE INTEGRATION WITH VEHICLES

BACKGROUND

The invention relates to the field of transportation vehicle security.

Coupling a mobile computer device, such as a smartphone, with a transportation vehicle may allow improved driver experience, for example, navigation, customization, and/or the like. As used herein the term vehicle means a transportation vehicle, such as a car, a bus, a truck, a boat, a plane, or the like. New technologies may facilitate many valuable capabilities such as one or more of improved driver safety, vehicle performance, driver and passenger comfort, and/or the like. Modern transportation vehicles may comprise large complex computer systems. Vehicles may be controlled and monitored by dozens of Electronic Control Units (ECUs) that coordinate operations, communicate over one or more internal network buses, and/or the like. In addition, vehicles may be connected through a plethora of external network interfaces, e.g., RFID, Bluetooth, Dedicated Short Range Communication (DSRC), Wi-Fi, Cellular, and/or the like. This connectivity facilitates a variety of services, e.g., telematics, navigation, safety, and/or the like, and may benefit automakers, aftermarket vendors, fleet managers, passengers, and/or the like. As used herein the term connected, integrated, linked, of the like refer to establishing a digital data connection through a wired or wireless communication technology.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a computerized method comprising, on a mobile computing device, processing a vehicle integration request made by one or more of (i) the mobile computing device and (ii) a transportation vehicle. The mobile computing device computes a risk assessment value that quantifies a security risk to the transportation vehicle as a result of connecting the mobile computing device to the transportation vehicle, where the computing is based on one or more of a hardware and a software of the mobile computing device. The mobile computing device transmits the risk assessment value to a vehicle computer integrated in the transportation vehicle. The mobile computing device completes a digital data connection with the vehicle computer when the risk assessment value complies with a vehicle access security policy of the vehicle computer.

According to some embodiments, the mobile computing device receives a vehicle access to the transportation vehicle from the vehicle computer, where the vehicle access is based on the risk assessment value and the vehicle access security policy, and where the vehicle access comprises one or more of (a) a digital access to the vehicle computer, (b) a physical access to a docking station of the vehicle, (c) an operational access to the vehicle computer, (d) a logical access to the vehicle computer, and (e) a control access to the transportation vehicle.

According to some embodiments, the vehicle access is selected from two or more stratified access levels according to the risk assessment value, wherein the stratified access levels are determined according to the vehicle access security policy, and where the vehicle access is at least one of: (a) a mobile device access to at least one vehicle computer control, and (b) a user access to at least one physical control.

According to some embodiments, the physical control is one or more control from the group consisting of a control to open the doors of the vehicle, a control to start the engine of the vehicle, a control to access digitally a storage medium of the vehicle according to one or more of a read access and a write access, and a control to open one or more compartment of the vehicle.

According to some embodiments, the method further comprises transmitting a digital authentication certificate request from the mobile device to a certificate authority, receiving a digital authentication certificate from the certificate authority, and transmitting the digital authentication certificate to the vehicle computer, where the completing is determined at least in part by the digital authentication certificate.

According to some embodiments, the method further comprises initiating the digital data connection prior to receiving the vehicle integration request.

According to some embodiments, the method further comprises initiating the digital data connection subsequent to transmitting the risk assessment value.

According to some embodiments, the method further comprises transmitting at least one of a mobile device identification code and a user identification code to the vehicle computer.

There is provided, in accordance with an embodiment, a mobile computing device, comprising one or more hardware processor. The mobile computing device, comprises a non-transitory computer readable storage medium, having encoded thereon processor instruction. The processor instructions are configured to process a vehicle integration request made by one or more of (i) the mobile computing device and (ii) a transportation vehicle. The processor instructions are configured to compute a risk assessment value that quantifies a security risk to the transportation vehicle as a result of connecting the mobile computing device to the transportation vehicle, where the computing is based on one or more of a hardware and a software of the mobile computing device. The processor instructions are configured to transmit the risk assessment value to a vehicle computer integrated in the transportation vehicle. The processor instructions are configured to complete a digital data connection with the vehicle computer when the risk assessment value complies with a vehicle access security policy of the vehicle computer.

According to some embodiments, the processor instructions are further configured to receive a vehicle access to the transportation vehicle from the vehicle computer, where the vehicle access is based on the risk assessment value and the vehicle access security policy, and where the vehicle access comprises one or more of (a) a digital access to a database connected to the vehicle computer, (b) a physical access to a docking station of the vehicle, (c) an operational access to the vehicle computer, (d) a logical access to the vehicle computer, and (e) a control access to the transportation vehicle.

According to some embodiments, the vehicle access is selected from a plurality of stratified access levels according to the risk assessment value, wherein the plurality of stratified access levels are determined according to the vehicle access security policy, and wherein the vehicle access is at least one of: (a) a mobile device access to at least one vehicle computer control, and (b) a user access to at least one physical control.

According to some embodiments, the physical control is one or more control from the group consisting of a control to open the doors of the vehicle, a control to start the engine of the vehicle, a control to access digitally a storage medium of the vehicle according to one or more of a read access and a write access, and a control to open one or more compartment of the vehicle.

According to some embodiments, the processor instruction are further configured to transmit a digital authentication certificate request from the mobile device to a certificate authority, receive a digital authentication certificate from the certificate authority, and transmit the digital authentication certificate to the vehicle computer, where the completing is determined at least in part by the digital authentication certificate.

According to some embodiments, the processor instructions are further configured to transmit at least one of a mobile device identification code and a user identification code to the vehicle computer.

There is provided, in accordance with an embodiment, a transportation vehicle computer comprising at least one hardware processor, and a non-transitory computer-readable storage medium having program code embodied therewith. The program code executable by the at least one hardware processor to process a vehicle integration request made by at least one of (i) a mobile computing device and (ii) the transportation vehicle computer. The program code executable by the at least one hardware processor to receive a risk assessment value from the mobile computing device. The program code executable by the at least one hardware processor to select one of a plurality of access levels according to the risk assessment value, wherein the plurality of access levels stratify security risks of a vehicle access according to a vehicle access security policy, and wherein the vehicle access is at least one of: (a) a mobile device access to at least one vehicle computer control, and (b) a user access to at least one physical control. The program code executable by the at least one hardware processor to complete a digital data connection with the transportation vehicle computer when the risk assessment value complies with a vehicle access security policy of the vehicle.

According to some embodiments, the program code further comprises processor instructions configured to grant a vehicle access to the transportation vehicle, wherein the vehicle access is based on the risk assessment value and the vehicle access security policy, and wherein the vehicle access comprises at least one of (a) a digital access to a database connected to the transportation vehicle computer, (b) a physical access to a docking station of the vehicle, (c) an operational access to the transportation vehicle computer, (d) a logical access to the vehicle computer, and (e) a control access to the transportation vehicle.

According to some embodiments, the program code further comprises processor instructions configured to transmit a request to the mobile computing device to compute the risk assessment value on the mobile computing device, and wherein the risk assessment value that quantifies a security risk to the transportation vehicle as a result of connecting the mobile computing device to the transportation vehicle, wherein the computing is based on at least one of a hardware and a software of the mobile computing device.

According to some embodiments, the physical control is at least one control from the group consisting of a control to open the doors of the vehicle, a control to start the engine of the vehicle, a control to access digitally a storage medium of the vehicle according to at least one of a read access and a write access, and a control to open at least one compartment of the vehicle.

According to some embodiments, the program code further comprises processor instructions configured to trigger the transmitting of a digital authentication certificate request from the mobile device to a certificate authority, and configured to receive a digital authentication certificate issued by the certificate authority, wherein at least one of the completing and the selecting the access level is determined by the digital authentication certificate.

According to some embodiments, the program code further comprises processor instructions configured to receive at least one of a mobile device identification code and a user identification code from the mobile computing device, and the access level is selected based on the at least one of a mobile device identification code and a user identification code.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
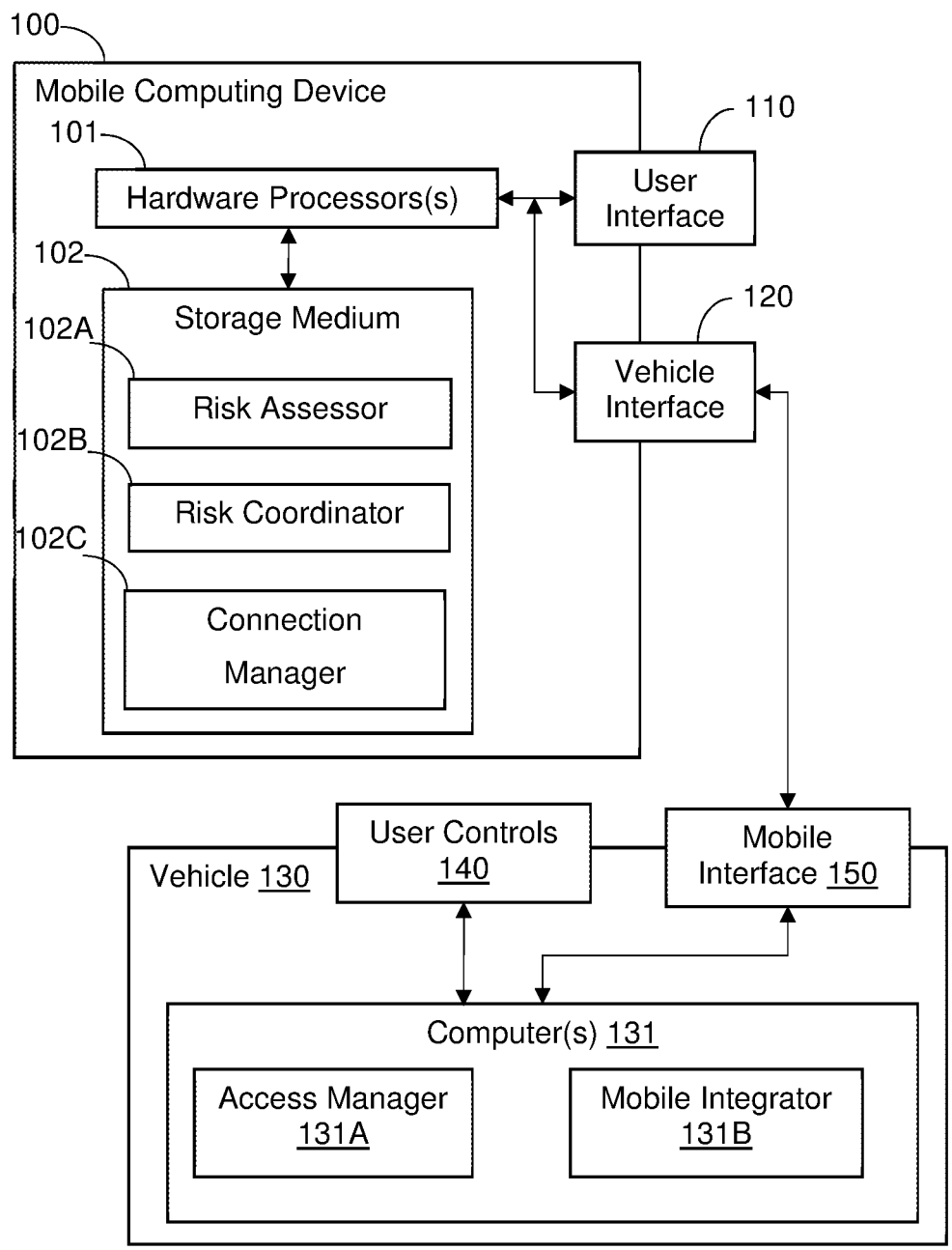
FIG. 1 schematically shows a mobile computing device with a vehicle connection risk assessment module.

Described herein are computerized methods and devices for mitigation of the risk from integration between mobile computing devices and transportation vehicles. Before completing a digital data connection between a mobile computing device and a transportation vehicle, a risk assessment is performed on the mobile computing device that quantifies the risk to the transportation vehicle from completing the digital connection. The risk assessment value may be compared with a vehicle integration/access security policy, and when the risk assessment value complies with the vehicle integration/access security policy, the mobile computing device may be allowed to complete the digital data connection with the vehicle. The risk assessment value may be transmitted to the vehicle for determining the compliance, and/or the compliance may be determined on the mobile device before allowing the initiation of the connection, limit the access of the mobile device, and/or the like. For example, a mobile computing device is a smartphone, a tablet, a notepad, a laptop, or the like.

Optionally, when the mobile computing device has a connection to the Internet, the mobile computing device retrieves a digital authentication certificate from a certificate authority and transmit the certificate to the transportation vehicle. For example, the digital certificate establishes a bona fide identification of the mobile device (such as a module executing on the device), and provides an assessment of the risk in connecting the device to the transportation vehicle. As used herein, the term digital certificate refers to the certificate given by an authority that proves ownership of a public key, and may be used to verify the identity of the owner of the certification. Other terms used to refer to this system are public key infrastructure, public key certificate, identity certificate, or the like.

Optionally, the mobile device transmits to the vehicle an identification code, such as one or more of an identification code mobile device, an identification code of a user, an identification code of a permission to operate the vehicle, and/or the like. For example, the identification code facilitates the vehicle in determining the access level according to a security policy.

Optionally, a risk assessment score/value complies with a vehicle security policy and the security policy allows multiple levels of access/control to the mobile device and/or user. As used herein the term security policy means the policy regarding integration and/or access of mobile computing devices to the transportation vehicle and/or computer. For example, a high-risk device is only allowed a read data access, access control to an audio device of the vehicle, and/or the like. For example, a low risk device with a digital certificate is allowed a full control data access to the vehicle, including access to the physical control interface of the vehicle, such as one or more of the start/stop switch, the acceleration control, the door latches, the door locks, the steering control, the autonomous driving control, and/or the like. As used herein, the terms physical access, physical control, or the like refers to an access, control or the like that the user can operate to interact with the vehicle. For example, the levels of access may include one or more of digital access to a database connected to the vehicle computer, physical access to a docking station of the vehicle, operational access to the vehicle computer, logical access to the vehicle computer, control access to the transportation vehicle, and/or the like.

As used herein, the term risk assessment score, value, or the like refers to a value representing the probability of a cyber security attack on a transportation vehicle from connecting a mobile computing device to that transportation vehicle. The value may be on a probability scale, a confidence scale, a percentage scale, an arbitrary scale of the like, and may be on the same scale used by the security policy.

Optionally the security policy is stored on the vehicle computer. For example, a standard security policy is stored on the computer, and a user that has previously installed an application on their mobile phone can access the vehicle. Optionally, the access is allowed because of a risk assessment score value computed by the mobile device, a digital certificate that the user retrieved from a certificate authority, an updated security policy, and/or the like. Optionally, when the vehicle has Internet access an updated security policy is retrieved.

Optionally, the mobile computing device connects to the vehicle with a wireless data connection, such as Bluetooth, wireless Ethernet (Wi-Fi), near-field communications (NFC), or the like.

Optionally, the mobile computing device connects to the vehicle with a wired connector, such as a universal serial bus (USB) connector, a docking station connector, a thunderbolt connector, or the like.

Optionally, a single transportation vehicle is configured to connect with multiple mobile computing devices. For example, the transportation vehicle is a rental car, a time-share car, or the like, and the car is configured to allow access to multiple users, each having a mobile device, such as a smartphone. An application installed on the mobile computing device may be configured for allowing the user access to the car.

Optionally, a single mobile computing device is configured to connect with multiple transportation vehicles. For example, a user of a smartphone has an installed application on the smartphone that allows the user to operate one of a fleet of time-share cars, reserve a specific car, pay for car usage, and/or compute a risk assessment value of connecting the mobile device to the car.

For example, in a car sharing service, a fleet manager allows customers to open and start a car using a mobile application. Using the risk and/or reputation score of the mobile device/user, the manager may be able to apply a security policy to a fleet of vehicles.

For example, a car manufacturer prevents a compromised mobile device from infecting computer systems within a car by limiting the integration/access level of the mobile device with the car. For example, a mobile device with low reputation and/or high risk score is limited to access only the car's audio system.

Reference is now made to FIG. 1, which schematically shows a mobile computing device 100 with a vehicle connection risk assessment module. Mobile computing device 100 comprises at least one hardware processor 101, a non-transient storage medium 102, a user interface 110 and a vehicle interface 120. Hardware processor 100 may retrieve processor instructions from storage medium 102, where the processor instructions may be stored in modules. A risk assessor module 102A may comprise processor instructions to receive a request for integration with a transportation vehicle 130, such as a request to establish a digital data connection between mobile computing device 100 and vehicle 130 using vehicle interface 120 and a mobile interface 150. Processor instructions of risk assessor module 102A may instruct hardware processor(s) 101 to inspect the hardware of mobile computing device 100, software of mobile computing device 100, reputation of a user of mobile computing device 100, retrieve a digital certificate from a certificate authority, and/or the like. Processor instructions of risk coordinator module 102B may instruct hardware processor(s) to transmit a risk assessment score to a computer 131 of vehicle 130, to initiate a data connection with vehicle 130, to retrieve a digital certificate, and/or the like. Processor instructions of connection manager module 102C may instruct hardware processor(s) to establish a data connection between vehicle interface 120 and mobile interface 150 of vehicle 130.

Vehicle 130 comprises at least one computer 131 configured to receive a risk assessment score, a digital certificate, a connection request, a vehicle integration request, and/or the like, and based on these, a security policy, and processor instructions of an access manager 131A, determine the access to vehicle 130. For example, user controls 140 can be selectively accessed based on the security risk. When mobile computing device 100 complies with a security policy, the computer may allow integration using instructions of a mobile integrator 131B.

Figure 2:
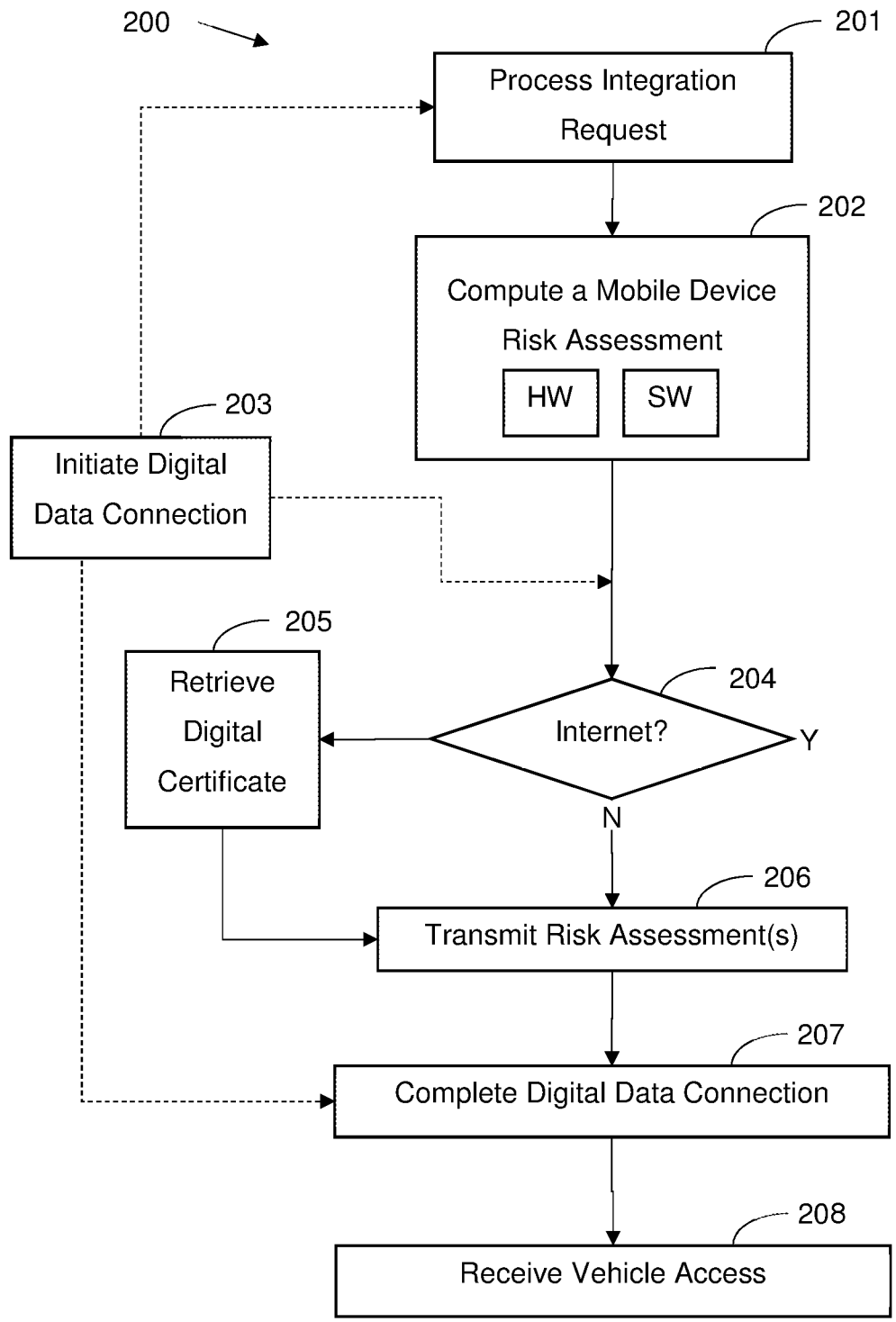
FIG. 2 schematically shows a flowchart of a method for processing an integration request on a mobile computing device.

Reference is now made to FIG. 2, which schematically shows a flowchart of a computerized method 200 for processing an integration request on mobile computing device 100. An integration request is received and processed 201 by computing 202 a mobile device risk assessment. The risk assessment includes an assessment of risk from the hardware of mobile computing device 100 and the software of mobile computing device 100. For example, the software of mobile computing device 100 is stored on storage medium 102, and may contain a Trojan computer virus for hijacking the vehicle. For example, the mobile computing device hardware has been rooted and the rooted mobile device does not include hacking prevention hardware. For example, a mobile computing device contains a software bridge between multiple networks. When mobile computing device 100 is connected to the Internet 204, a digital certificate may be retrieved 205 from a certificate authority. The risk assessment may be transmitted 206 to vehicle 130, and/or used internally by mobile computing device 100, to determine when mobile computing device 100 complies with a security policy, and thereby may be allowed to complete 207 a digital data connection and receive 208 access to a vehicle. The initiation 203 of the digital data connection may be before during or after the computing 202.

Figure 3:
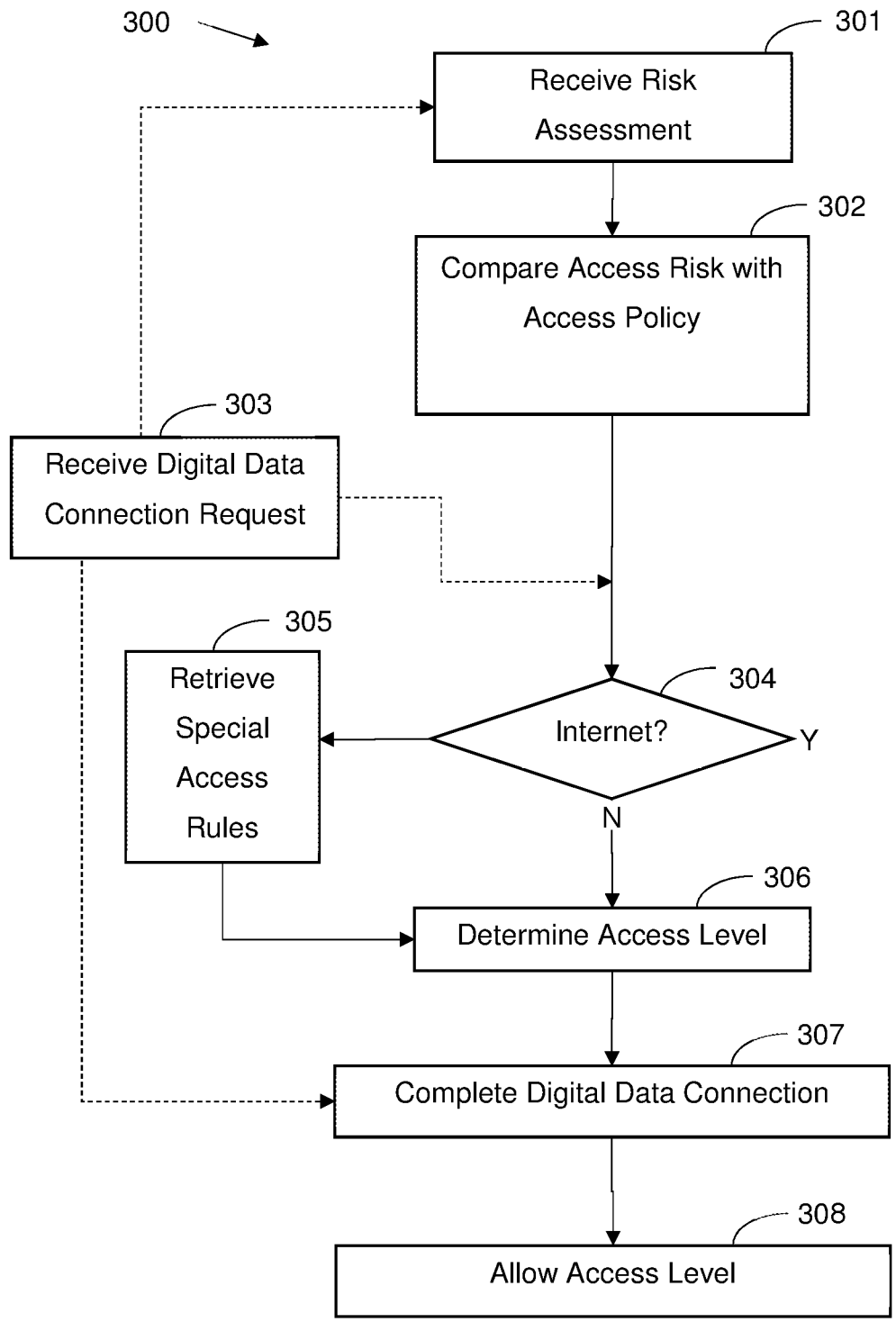
FIG. 3 schematically shows a flowchart of a method for processing an integration request on a vehicle computer.

Reference is now made to FIG. 3, which schematically shows a flowchart of a computerized method 300 for processing an integration request on a vehicle 130 computer(s) 131. A risk assessment received 301 received from mobile computing device 100 is compared 302 to an access security policy, optionally using a digital certificate also provided by mobile computing device 100. When vehicle 130 is connected to the Internet, special access rules may be retrieved 305, such as an updated security policy, a user access permission, and/or the like. Based on the security policy and risk assessment score, an access level is determined 306, and a digital data connection may be completed 307. Initiation 303 of the digital data connection may have been performed at any time before the completion 307. Once the connection is completed, an access level to vehicle 130 user controls 140 is allowed 308.

Following are further details of aspects of embodiments, including descriptions of the technical problem(s) and technical solution to the problem(s).

When allowing connectivity between transportation vehicles and external user devices, the digital communication channel may allow a threat vector for unauthorized access to the vehicle. According to embodiments described herein, a vehicle-side software module and/or a device-side software module may allow a pre-connection risk management protocol to control and mitigate this threat vector. For example, when a user requests to connect their mobile phone with their car wirelessly, such as to authenticate a driver, customize the car to his preferences, unlock the car, start the engine, and/or the like, a risk assessment agent on the mobile device may compute a risk score before allowing the connection. The risk score may be provided to the vehicle control module to give an indication of the level of security risk associated with connecting the mobile device to the vehicle. The vehicle control module may grant permissions for certain operations on the car systems according to the mobile device risk assessment. A cryptographic system may allow the vehicle control module to authenticate the risk assessment agent and validate its communication.

Due to sporadic Internet connectivity when access is granted, integration between multiple hosts and/or multiple clients, and the unknown sources of threat originations, the existing security solutions are not adapted to mitigate the security risks of digital integration between mobile computing devices and transportation vehicle(s). For example, vehicle host computers need to see a digital certificate from the user's mobile computing device. For example, challenge/response protocols are used independent of the digital data connection protocols. The independent protocols may provide independent risk mitigation that supplements the standard digital data protocols and protects the special cases of digital access to transportation vehicles. For example, the levels of access may be controlled by the vehicle computer based on the risk assessment score received from the mobile device, allowing another barrier to the threat vectors. This risk assessment may be updated once the vehicle and connected device establish Internet connectivity again. For example, a rental car user uses his mobile phone to access a car in an underground parking lot based on a car rental application installed on the mobile device, and when the user drives out of the underground parking lot the risk assessment is performed again with Internet connection to a certification authority by the mobile device and Internet connection to a rental company database by the car.

Many researchers have highlighted the vulnerability of modern vehicles to cyber-attacks. For example, Koscher et al., in "Experimental security analysis of a modern automobile," IEEE Symposium on Security and Privacy (SP), 2010, pp. 447-462, show that it may be possible to evade vehicle network defenses and infect ECUs with malware to control a wide range of essential vehicle functions, e.g., disable the brakes. For example, Miller et al., in "Adventures in automotive networks and control units", DEF CON 21 Hacking Conference, Las Vegas, N V, 2013, showed that it may be possible to control the steering, braking, acceleration and display of a target vehicle. For example, Checkoway et al., in "Comprehensive experimental analyses of automotive attack surfaces", published in the Proceedings of the 20th USENIX conference on Security, pages 6-6, San Francisco, Calif., Aug. 8-12, 2011, demonstrate a remote exploitation technique, illustrating several attack vectors (including Bluetooth and cellular radio), which may allow remote control over the vehicle, eavesdropping to the passenger's cabin, tracking the vehicle's location, and/or the like. For example, Francillon et al., in "Relay Attacks on Passive Keyless Entry and Start Systems in Modern Cars.," in Proceedings of the 18th Annual Network and Distributed System Security Symposium (NDSS 2011), San Diego, Calif., February 2011, showed that the wireless interface of the Tire Pressure Monitoring Systems may be hacked. For example, Ishtiaq Roufa et al., in "Security and privacy vulnerabilities of in-car wireless networks: A tire pressure monitoring system case study," in 19th USENIX Security Symposium, Washington D.C., 2010, pp. 11-13, showed that the Passive Keyless Entry and Engine Start-up system may be hacked.

A vehicle cyber-attack may use the integration of mobile devices (smartphone, tablet, etc.) with vehicles. Many vehicles today allow a passenger to connect their mobile device to the vehicle and use its resources, e.g., built-in display units as in CarPlay, Android Auto, and/or the like. The integration of mobile devices with vehicles may improve road safety by providing drivers with simple and intuitive interface with their mobile device that minimize distraction. The integration of mobile devices with vehicles may allow consumers to incorporate content and apps of their mobile devices with the vehicles. Furthermore, with the introduction of autonomous vehicles the threat for a cyber-terrorism attack may be increased in the future.

There exist a wide variety of smartphones and tablets, several operating system choices, and an abundance of security risks to manage. Furthermore, the ever-growing number of applications significantly increases the possibility of end users being at an increased cyber-security risk, such as from installing a suspicious app, being attacked by a social engineering attack, such as a confidence trick, downloading/installing malware accidently, and/or the like. Cybercriminals may have advanced their attack methods on the mobile device, from simple attacks such as bypassing the mobile device ID, cross-channel attacks leveraged on one-time passwords (OTP), and/or the like, to advanced attacks, such as mobile phishing, malware targeting the mobile platform, Trojans, and/or the like. The advance of mobile fraud methods, and the opportunities to profit from vehicle attacks (such as hijacking, ransomware, and/or the like) may encourage cybercriminals to increasingly target transportation vehicles.

The threat of mobile integration becomes even more complicated by contemporary car owner models, such as car-sharing, short-term car hire, ride-sourcing, on-demand ride services, and/or the like. In these new car-ownership models, many different mobile devices will be integrated with each shared vehicle, thereby, significantly increasing the risk of the vehicle being hacked by a compromised mobile device.

In this disclosure, secure mobile integration with transportation vehicles is facilitated by preventing compromised mobile device (or devices suspected of compromise) from being integrated with the vehicle. Before a mobile device is digitally connected with a vehicle (via USB, Bluetooth, Wi-Fi, or the like), the hosting platform may communicate with the mobile device to assess the security status of the mobile device and the risk it may pose to the vehicle. Based on this assessment, the hosting platform may decide whether to authorize the mobile integration, prevent the mobile integration, limit access after mobile integration, or the like. Enhanced solutions may rely on backend assistance to validate the reliability of the mobile security assessment received by the mobile risk engine, such as using digital security certificates.

Important optional aspects of embodiments may be:
compatibility with current vehicle software designs and connection protocols,
secure mobile integration for all interfaces (USB, Bluetooth etc.),
deployment of a software module on the mobile computing device,
deployment of a software module on the vehicle computer,
and/or the like.

Applying a pre-defined security policy for mobile device integration within the vehicle may be performed on either the mobile computing device, the vehicle computer, or both. The processor may block or limit any attempt of mobile integration unless the mobile has an application installed, that application computes a risk assessment of the mobile device, the risk assessment is transferred to the vehicle computer, and/or the like. When the mobile device attempts to integrate with the vehicle, the mobile assessment module and vehicle access control module may communicate between them to assess the security status of the mobile device, the risk it poses to the vehicle, the access requested, the access required until further mitigation may be performed, the corrective and preventative actions that may reduce the risk, and/or the like. Based on a risk assessment and a pre-defined security policy, the vehicle module may decide what access privileges to authorize the integrated mobile device.

The mobile device may generate accurate security assessments of the mobile device based on multiple device risk factors, by using multiple data sources, and/or the like. The mobile device risk assessor module may assess device risk based on detection of root evasion technique, malware infections evidence, OS patching, Jail-breaking evidence, Wi-Fi security, suspicious apps installed, and/or the like. Mobile risk assessment may be performed upon application installation, upon vehicle access, and/or the like.

Modules may be equipped with a secret key to facilitate mobile risk assessor authentication. A challenge-response algorithm authentication technique may be used to authenticate the mobile device and/or application.

For example, an integration process may comprise the steps where:
(1) the mobile computing device transmits the hosting platform (e.g., Harman head unit) an integration request,
(2) the vehicle computer requests a permission to authorize the integration,
(3) the vehicle computer requests a security assessment of the mobile device from mobile assessor. The request may also include unique challenge value(s) for authentication proposes,
(4) the mobile assessor evaluates the mobile device security risk to the vehicle (based on the risk factors, methodologies, and/or the like), and replies with the device risk assessment. The reply may include the mobile assessor response that was generated using a secret key,
(5) the vehicle computer may authenticate the mobile integration risk according to the received response. Once authenticated, the vehicle computer may evaluate compliance with a pre-defined security integration policy based on the received risk assessment, and/or
(6) based on the compliance, the vehicle computer may decide what access privileges to authorize for the integrated mobile device.

Optionally, a Public Key Infrastructure (PKI) may be used to authenticate the mobile computing device and/or the vehicle computer. For example, the integration process may include an authentication mechanism, such as a digital certificate issued by a certification authority.

For example, an integration process may comprise the steps where:
(1) the mobile assessor transmits a risk assessment to a certificate authority,
(2) the mobile assessor receives a digital certificate from the certificate authority, where the digital certificate may incorporate the risk assessment,
(3) the mobile assessor forwards the digital certificate to vehicle computer, and/or
(4) the vehicle computer validates the digital certificate.

Optionally, the certificate authority holds a list of revoked public keys. When a request is received, the certificate authority may provide security status certificate only for a device not specified in the revocation list. Accordingly, the burden of maintaining the revocation list to the vehicle computer may be avoided.

Optionally, the mobile device performs the risk assessment before initiating the digital data connection. For example, the risk assessment is performed by the processor according to instruction in a mobile application (app). For example, the app is compatible multiple connection layers and different vehicle connection protocols. For example, the risk protection works as a role base access control by allocating access privileges to the vehicle based on a user's role. For example, the risk protection works as a reputation based access control by allocating access privileges to a car system based on the mobile device risk assessment score, a mobile device reputation score, a user's reputation score, and/or the like. For example, when a connection between the mobile device and the car is established, the vehicle computer will grant access privileges based on the risk assessment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method comprising, on a mobile computing device:
when the mobile computing device does not have Internet connectivity:
processing a vehicle integration request made by at least one of (i) the mobile computing device and (ii) a transportation vehicle;
computing a risk assessment value that quantifies a security risk to the transportation vehicle as a result of connecting the mobile computing device to the transportation vehicle, wherein the computing is based on a scanning of at least one of a hardware and a software of the mobile computing device, wherein the scanning comprises determining whether:
(a) the mobile computing device is infected with a computer virus for hijacking the transportation vehicle,
(b) the mobile computing device is not equipped with a hacking prevention hardware, or
(c) the mobile computing device contains a software bridge between multiple networks;
transmitting the risk assessment value to a vehicle computer integrated in the transportation vehicle;
completing a digital data connection with the vehicle computer when the risk assessment value complies with a vehicle access security policy of the vehicle computer;
receiving permission from the vehicle computer to access the vehicle, wherein: (i) a level of the permitted access is based on the risk assessment value and on the vehicle access security policy, and (ii) the permitted access is limited to no more than the following, for as long as the mobile computing device does not have Internet connectivity: read data from the vehicle computer, and control an audio system of the vehicle;
when the mobile computing device has Internet connectivity:
updating the risk assessment value;
transmitting a digital authentication certificate request from the mobile device to a certificate authority over the Internet, receiving a digital authentication certificate from the certificate authority over the Internet, and transmitting the digital authentication certificate to the vehicle computer; and
increasing the level of the permitted access to include at least one of: access to a start/stop switch of the vehicle, access to an acceleration control of the vehicle, access to door latches of the vehicle, access to door locks of the vehicle, access to steering control of the vehicle, and access to an autonomous driving control of the vehicle.

2. The method according to claim 1, further comprising transmitting at least one of a mobile device identification code and a user identification code to the vehicle computer.

3. A mobile computing device, comprising:
at least one hardware processor; and
a non-transitory computer readable storage medium, having encoded thereon processor instruction configured to:
when the mobile computing device does not have Internet connectivity:
process a vehicle integration request made by at least one of (i) the mobile computing device and (ii) a transportation vehicle;
compute a risk assessment value that quantifies a security risk to the transportation vehicle as a result of connecting the mobile computing device to the transportation vehicle, wherein the computing is based on a scanning of at least one of a hardware and a software of the mobile computing device, wherein the scanning comprises determining whether:
(a) the mobile computing device is infected with a computer virus for hijacking the transportation vehicle,
(b) the mobile computing device is not equipped with a hacking prevention hardware, or
(c) the mobile computing device contains a software bridge between multiple networks;
transmit the risk assessment value to a vehicle computer integrated in the transportation vehicle;
complete a digital data connection with the vehicle computer when the risk assessment value complies with a vehicle access security policy of the vehicle computer;
receive permission from the vehicle computer to access the vehicle, wherein: (i) a level of the permitted access is based on the risk assessment value and on the vehicle access security policy, and (ii) the permitted access is limited to no more than the following, for as long as the mobile computing device does not have Internet connectivity: read data from the vehicle computer, and control an audio system of the vehicle;
when the mobile computing device has Internet connectivity:
update the risk assessment value;
transmit a digital authentication certificate request from the mobile device to a certificate authority over the Internet, receive a digital authentication certificate from the certificate authority over the Internet, and transmit the digital authentication certificate to the vehicle computer; and
increase the level of the permitted access to include at least one of: access to a start/stop switch of the vehicle, access to an acceleration control of the vehicle, access to door latches of the vehicle, access to door locks of the vehicle, access to steering control of the vehicle, and access to an autonomous driving control of the vehicle.

4. The mobile computing device according to claim 3, wherein the processor instructions are further configured to transmit at least one of a mobile device identification code and a user identification code to the vehicle computer.

5. A transportation vehicle computer comprising:
at least one hardware processor; and
a non-transitory computer-readable storage medium having program code embodied therewith, the program code executable by the at least one hardware processor to:
when the mobile computing device does not have Internet connectivity:

process a vehicle integration request made by at least one of (i) a mobile computing device and (ii) the transportation vehicle computer;
receive a risk assessment value from the mobile computing device, wherein the risk assessment value is computed by the mobile computing device based on a scanning of at least one of a hardware and a software of the mobile computing device, wherein the scanning comprises determining whether:
(a) the mobile computing device is infected with a computer virus for hijacking the transportation vehicle,
(b) the mobile computing device is not equipped with a hacking prevention hardware, or
(c) the mobile computing device contains a software bridge between multiple networks;
select one of a plurality of access levels according to the risk assessment value, wherein the plurality of access levels stratify security risks of a vehicle access according to a vehicle access security policy, and wherein the vehicle access is at least one of: (a) a mobile device access to at least one vehicle computer control, and (b) a user access to at least one physical control;
complete a digital data connection with the transportation vehicle computer when the risk assessment value complies with a vehicle access security policy of the vehicle;
receive permission from the vehicle computer to access the vehicle, wherein: (i) a level of the permitted access is based on the risk assessment value and on the vehicle access security policy, and (ii) the permitted access is limited to no more than the following, for as long as the mobile computing device does not have Internet connectivity: read data from the vehicle computer, and control an audio system of the vehicle;
when the mobile computing device has Internet connectivity:
update the risk assessment value;
transmit a digital authentication certificate request from the mobile device to a certificate authority over the Internet, receive a digital authentication certificate from the certificate authority over the Internet, and transmit the digital authentication certificate to the vehicle computer; and
increase the level of the permitted access to include at least one of: access to a start/stop switch of the vehicle, access to an acceleration control of the vehicle, access to door latches of the vehicle, access to door locks of the vehicle, access to steering control of the vehicle, and access to an autonomous driving control of the vehicle.

6. The transportation vehicle computer according to claim 5, wherein the program code further comprises processor instructions configured to receive at least one of a mobile device identification code and a user identification code from the mobile computing device, and the access level is selected based on the at least one of a mobile device identification code and a user identification code.

* * * * *